United States Patent [19]

Crean

[11] Patent Number: 4,540,990

[45] Date of Patent: Sep. 10, 1985

[54] INK JET PRINTER WITH DROPLET THROW DISTANCE CORRECTION

[75] Inventor: Peter A. Crean, Penfield, N.Y.

[73] Assignee: Xerox Corporation, Stamford, Conn.

[21] Appl. No.: 663,512

[22] Filed: Oct. 22, 1984

[51] Int. Cl.[3] .............................................. G01D 15/18

[52] U.S. Cl. ...................................................... 346/75

[58] Field of Search .............................. 346/75, 140 R

[56] References Cited

U.S. PATENT DOCUMENTS

| | | | |
|---|---|---|---|
| 3,844,161 | 10/1974 | Kay | 73/37.5 |
| 3,864,692 | 2/1975 | McDonnell et al. | 346/75 |
| 4,136,345 | 1/1979 | Neville et al. | 346/75 |
| 4,138,688 | 2/1979 | Heard et al. | 346/75 |
| 4,158,204 | 6/1979 | Kuhn et al. | 346/75 |
| 4,238,804 | 12/1980 | Warren | 346/75 |
| 4,255,754 | 3/1981 | Crean et al. | 346/75 |
| 4,274,100 | 6/1981 | Pond | 346/75 |
| 4,345,262 | 8/1982 | Shirato et al. | 346/140 R |
| 4,424,518 | 1/1984 | Suzuki et al. | 346/75 |

OTHER PUBLICATIONS

Research Disclosure Journal, 20123, Jan. 1981, by S. C. Paranjpe, Title: Ink Jet Printer with Correction for Misdirected Jet Drop Streams.

IBM Technical Disclosure Bulletin, vol. 22, No. 7, Dec. 1979, by J. R. Booth et al., Title: Adaptive Flight Time Correction for Ink Jet Printers.

Article "Classification of Pneumatic Proximity Position Printers Sensors", from Machine and Tooling, vol. 48, No. 1, 1977, pp. 36-38, by B. A. Sentyakov et al.

*Primary Examiner*—E. A. Goldberg
*Assistant Examiner*—Gerald E. Preston
*Attorney, Agent, or Firm*—Robert A. Chittum

[57] ABSTRACT

An improved continuous stream ink jet printer is disclosed that conducts pagewidth printing via an array of fixed nozzles which direct droplets towards a moving recording medium. Each nozzle is assigned a segment of a printable line that extends across the entire width of the recording medium. The droplets from each nozzle are charged with printing information and fanned along its segment to specific pixels locations or to a gutter for recirculation. Distance sensing sensors are located below the droplet trajectories, parallel to the recording medium surface and perpendicular to the direction of movement of the recording medium. The distance sensing sensors periodically produce signals representative of the actual throw distance of the droplets and compare the signals indicative of the actual throw distance to a signal representative of the distance from the nozzles to a predetermined printing plane. The comparison signals are sent to the printer controller which adjusts the droplet trajectories in response thereto to correct the droplet placement errors that would be caused by variations in the throw distance produced, for example, by wrinkles in the recording medium or dimensional tolerance variations in the recording medium transport system where the printing occurs.

6 Claims, 2 Drawing Figures

INK JET PRINTER WITH DROPLET THROW DISTANCE CORRECTION

BACKGROUND OF THE INVENTION

1. Field of the Invention

This invention relates to continuous stream, pagewidth ink jet printing and, more particularly, relates to an ink jet printer having means for correcting the droplet trajectories to account for variations in the droplet throw distance, thus improving droplet placement accuracy.

2. Description of the Prior Art

As is known in the art, ink jet printing is a form of non-impact printing wherein ink droplets are caused to impinge upon a recording medium, such as, for example, paper or the like. Ink jet printing is generally categorized as drop-on-demand or continuous stream. In drop-on-demand systems, a droplet is expelled by a droplet generator only when a droplet is required to build information on the recording medium. The continuous stream type systems continually emit streams of droplets. The droplets not required to print information on the recording medium are directed to a gutter, whereat the unused droplets are collected and reused.

Within the continuous stream type of ink jet printer, there exists two basic architectures. One comprises a droplet generator having one or more nozzles which traverse back and forth across the recording medium. The other basic architecture includes a fixed array of nozzles, each of which direct ink droplets to only selected portions of a moving recording medium.

In continuous stream, pagewidth printing, a lineal array of fixed nozzles are positioned transverse to the direction of a moving recording medium and each nozzle directs a stream of ink towards the recording medium. The ink from the nozzles is under a predetermined pressure and is perturbed at a predetermined frequency, so that the streams break into droplets at the approximate same fixed distance from their respective nozzles and, once into droplets, travel at about the same velocity. Each nozzle is assigned printing responsibility for a lineal segment, the total number of lineal segments produce a line across the width of the recording medium. To cause the droplets of each nozzle to fan out across its lineal segment, they are charged by a charging electrode at the breakoff point of the ink stream according to digitized data signals and the charged droplets are passed through an electric field. Those droplets that are not to be printed are directed to a gutter for collection and recirculation to the ink supply for reuse.

Each of the multiple ink jet nozzles of the continuous stream, pagewidth printing architecture throws droplets to specific locations along its lineal segments. When such an ink jet printer is functioning properly, the ink droplets from adjacent nozzles targeted for respective confronting end locations on their adjacent lineal segments "stitch" together without unwanted overlap or without out-of-tolerance gaps therebetween. Further details regarding this type of ink jet printer can be obtained, for example, by reference to U.S. Pat. No. 4,238,804 to Warren.

As droplets from each nozzle are generated and deflected along various trajectories to specific locations within their assigned lineal segment, there is a need to monitor and to correct the performance of the ink jet printer components such as the droplet generator, charging electrode and deflection field so that calibration of the printer does not deteriorate. One important calibration check is that of the stitching point between lineal segments printed by droplets from adjacent nozzles. Neither droplet overlap or gaps between lineal segments can be permitted, if the ink jet printed image is to be uninterrupted across the full width of the recording medium. It is known from U.S. Pat. No. 4,255,754 to Crean et al, for example, to place a sensor at locations representing each end of each lineal segment to optically sense the droplets passing thereby and then determine the precise position of those droplets. This information is used to monitor and correct the charges to be placed on subsequent droplets issuing from each nozzle in order to accurately direct the droplets to be printed to their designated impact or pixel locations on the recording medium.

Research Disclosure 20123, January 1981, by S. C. Paranjpe discloses a correction method for misdirected droplets caused by, for example, manufacturing defects and dimensional tolerance variations. Printing errors are corrected by adjusting the charge voltage prior to subjecting the droplets to the deflection field. A correction alogrithm for each ink jet stream may be developled, and, if desired, the algorithm can be altered over the life of the printhead, as the misalignment of jets produced by the printhead gradually changes.

IBM Technical Disclosure Bulletin, Vol. 22, No. 7, December 1979 by J. R. Booth et al discloses a technique for correcting the fight time of droplets from a reciprocating, ink jet printhead to a fixed, but steppable recording medium to compensate for the impact position error caused by the movement of the printhead relative to the recording medium during the droplet flight time from the printhead to the recording medium.

U.S. Pat. No. 4,136,345 to M. H. Neville et al discloses several height sensing techniques for detecting the deviation of the height of a vertically fanned sequence of droplets from a predetermined flight path and correcting the deviation in subsequence droplets. In one technique, the droplet velocity is determined and adjusted to achieve the desired flight path by increasing or decreasing the nozzle pressure.

U.S. Pat. No. 4,158,204 to L. Kuhn et al discloses a system to correct velocity variations between a plurality of ink jet streams caused by such items as nozzle imperfections, clearances, accumulations and deposits of ink and the like. The velocity compensations between streams of droplets may be made by adjusting the time at which information imparting signals are applied to the respective droplet charging electrodes.

U.S. Pat. No. 3,864,692 to J. A. McDonnell et al discloses a system for controlling ink droplet flight paths by varying the time that voltage is applied to the deflection electrodes to impart to each droplet in a sequence of droplets a different trajectory according to the time each droplet is subjected to the deflection force.

U.S. Pat. No. 4,138,688 to R. S. Heard et al discloses a system for controlling the flight paths of the ink droplets. To compensate for the droplet placement error caused by movement of a printhead relative to the recording medium, a voltage gradient is applied across at least one of the deflection electrodes so as to effect electric field distortion to thereby compensate for the droplet misalignment due to the printhead motion. The amount of distortion is controlled by monitoring the printhead velocity and automatically feeding back a signal to the circuitry controlling the distortion of the electric field between the deflection electrodes.

None of the prior art above recognizes or addresses the problem of stitch point error in a multiple nozzle pagewidth printer caused by variation in the throw distance from nozzle to nozzle to the recording medium, such error, being generated, for example, by variation in recording medium thickness, slight curling or wrinkling of the recording medium and throw distance variations caused by recording medium transport or platen tolerances.

SUMMARY OF THE INVENTION

It is an object of this invention to improve droplet placement accuracy on a moving recording medium by a multiple nozzle, continuous stream ink jet printer.

It is another object of this invention to achieve the improved droplet placement accuracy by monitoring the droplet throw distance (i.e., the distance from an ink jet printer nozzle to the recording medium surface) and creating a signal indicative of the throw distance that is used to adjust the droplet trajectories as necessary.

It is still another object of this invention to constantly monitor the droplet throw distance to adjacent lineal segments across the full width of a continually moving recording medium in a direction traverse to the recording medium movement per nozzle or groups of nozzle and to adjust the trajectories of the droplets emitted from the one or more fixed nozzles assigned to each respective lineal segments to compensate for the placement errors produced by variations in the throw distances.

In one embodiment of the present invention an optical distance-sensing device is used to direct a light beam to the recording medium and to receive a reflection therefrom, which produces a signal that is proportional to the distance from the optical device to the recording medium. The signal is used to vary either the deflection voltage of the deflection electrodes or the gain of the charge amplifiers to the charging electrodes. This change in deflection or charging voltage adjusts the droplet trajectories to move the pixel or impact location in response to the variation in the droplet throw distance, so that the droplet-to-droplet spacing is maintained, especially between adjacent pixel targets from separate, adjacent nozzles.

A fixed array of optical distance-sensing devices is positioned parallel to and below the array of fixed nozzles a predetermined distance from the recording medium. Each optical distance-sensing device is assigned a specific point or portion of the moving recording medium. Alternatively, the array of optical distance-sensing devices are mounted on an oscillating bar, with the devices being parallel to the fixed nozzles. Movement of the oscillating bar is in a direction parallel to the nozzles and perpendicular to the direction of movement of the recording medium, so that one or more locations across the entire width of the recording medium may be scanned to pick up multiple throw distance variations such as wrinkles in the recording medium.

In another embodiment of the present invention, pneumatic proximity sensing devices are used instead of the optical devices.

DESCRIPTION OF THE PREFERRED EMBODIMENT

Figure 1:
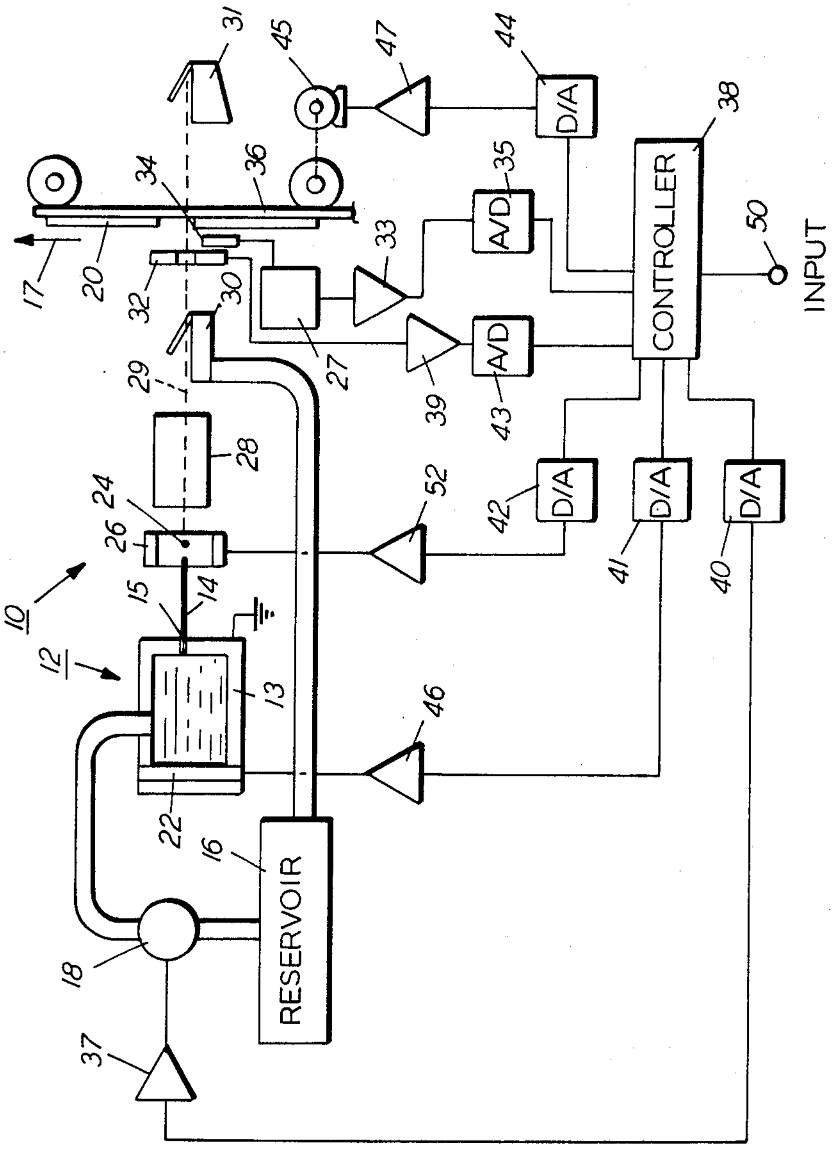
FIG. 1 is a schematic elevation view of a multiple nozzle, continuous stream type pagewidth ink jet printer, incorporating a distance-sensing device for use in correcting the droplet trajectories to account for variations in the droplet throw distance.

Referring to the drawings and in particular to FIG. 1, a schematic representation of a continuous stream type ink jet printer 10 is depicted, comprising a fixed ink jet generator 12 having a manifold 13 with a plurality of nozzles or orifices 15 for producing jet columns or ink streams 14. Since FIG. 1 is a side view, only one ink stream is seen, but it should be appreciated that a linear series or array of nozzles 15 extend along the manifold to generate a series of parallel ink streams. The generator 12 is coupled to an ink reservoir 16 from which ink is pumped by pump 18 to the generator 12. The pump 18 maintains ink inside the manifold 13 at a steady pressure sufficient to cause ink to be squirted through the nozzles toward a recording medium 20 moving in a direction perpendicular to the linear array of nozzles. Also coupled to the generator is a source of exitation 22, such as a piezoelectric device, which causes the streams 14 to break up into ink droplets 24 at a predetermined distance from the nozzles. As the ink streams are breaking into individual droplets, a charging electrode 26 induces a net electric charge on each droplet in accordance with a scheme or algorithm related to a desired subsequent droplet trajectory.

Downstream from the charging electrode 26 are located a number of field creating or deflection electrodes 28 which are energized to voltages which create an electric field through which the charged droplets 24 must pass. As is well known, a charged particle passing through an electric field will experience a force related to both the magnitude and polarity of the charge on the particle and the electric field strength through which it is passing. An uncharged droplet, therefore, will pass unimpeded through the deflection electrodes 28 toward the recording medium 20. A charged particle will be diverted from its initial trajectory depending upon its charge magnitude and polarity. By transmitting appropriate charging potentials to the charging electrode 26 as each droplet is formed and passes that electrode, each droplet is directed to a desired impact location, hereinafter referred to as a pixel, on the surface of the recording medium or to a gutter 30.

Figure 2:
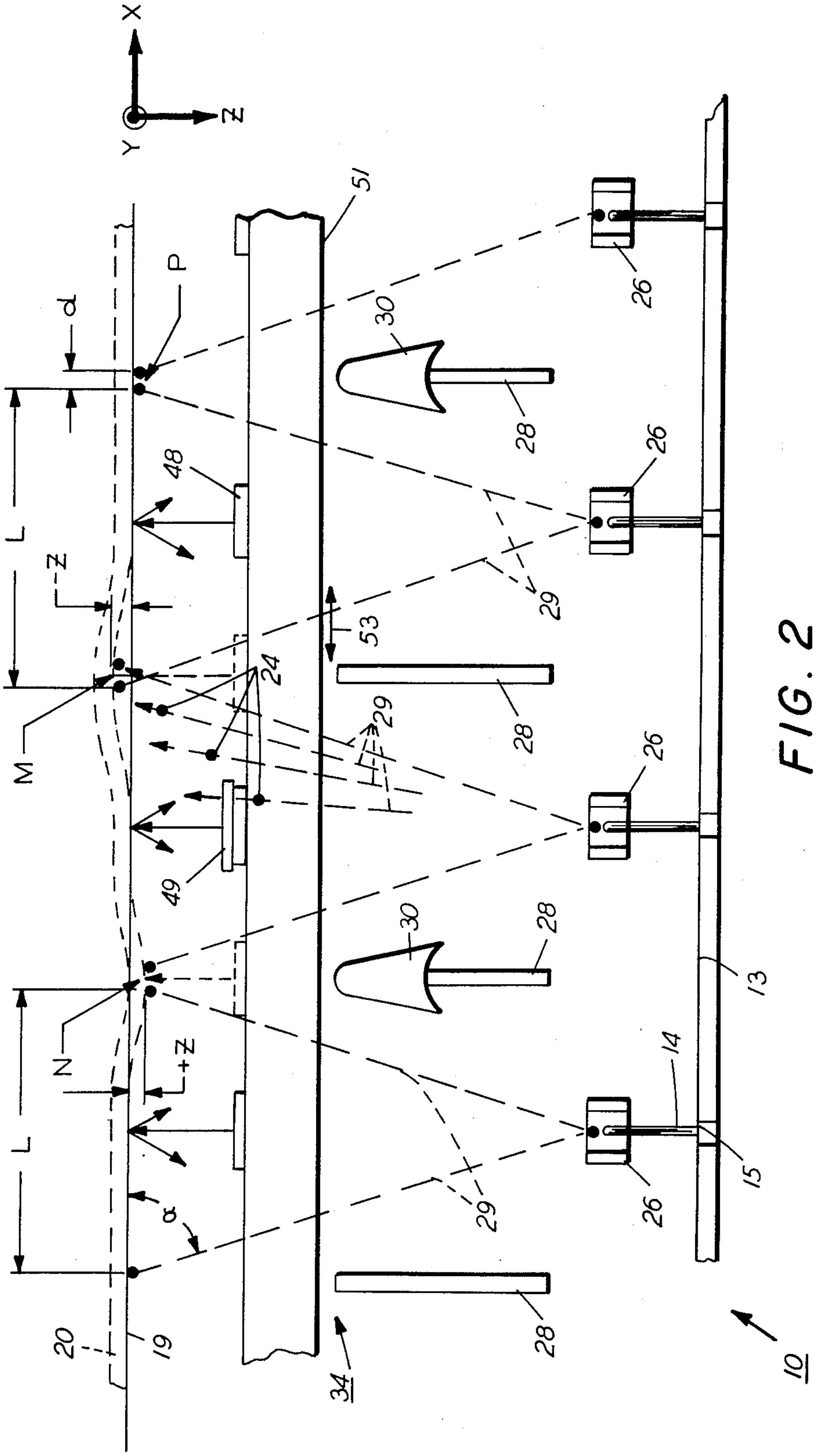
FIG. 2 is a plan view of a portion of the printer of FIG. 1, showing the distance-sensing device, the printing reference plane, and the recording medium in dashed line in order to depict variations in the distance of the surface of the recording medium to the printer nozzles across the width of the recording medium and, hence, the variations in droplet throw distance from nozzle-to-nozzle.

It is well known that the droplets in continuous stream printers may be charged with one polarity (unipolar system) or with both polarities referred to as a bipolar system. FIG. 2 depicts a bipolar system, so that the highly charged droplets are directed to the gutter 30 for recirculation to the ink reservoir 16.

Droplets which are either uncharged or charged to a level insufficient to cause their trajectory 29 (shown in dashed line) to lead to the gutter 30 are directed past a calibration monitoring sensor 32 and a distance sensing sensor 34 to the recording medium 20. The distance sensing sensor will be more fully discussed later. The calibration sensor 32 is used to sense passage of ink droplets 24 toward the recording medium and to modify printer operation to insure that the ink droplets from the plurality of ink streams are properly "stitched" together to allow each incremental segment "L" on the surface of the recording medium to be accessed or printed by droplets from the segment's assigned nozzle. By stitching it is meant that the center of adjacent pixels from adjacent segments "L" (see FIG. 2) are located the distance of one pixel diameter or droplet diameter after impact, which is about 75 microns,so that when those pixels are printed they do not excessively overlap or have a detectable gap therebetween (i.e., the total system tolerance for overlap or gap is about ±12 microns).

An example of the use and application of typical calibration sensor 32 is disclosed in U.S. Pat. No. 4,255,754 to Crean et al entitled "Differential Fiber Optic Sensing Method and Apparatus for Ink Jet Recording." The Crean et al patent is assigned to the assignee of the present invention and is herein expressly incorporated by reference. The functioning of the calibration sensor 32 is to monitor and calibrate the ink jet printer 10 by observing droplet trajectories therepast during a calibration mode of operation.

A second gutter 31 for recirculating ink droplets is used to intercept droplets generated while calibrating the system with the aid of calibration sensor 32. One application to which the present invention has particular applicability is a high speed ink jet device wherein successive sheets of recording medium 20, such as paper, are transmitted past the ink droplet generator 12 in a direction perpendicular to the array of nozzles 15, as shown by arrow 17, whereat the paper is encoded with information. Experience has indicated that it is desirable to recalibrate the printer at periodic intervals to insure that the droplets 24 are directed to the desired regions or pixels on the recording medium 20. To accomplish this calibration, ink droplets are generated and caused to travel past the sensors 32 when no recording medium is in position to receive those droplets; for example, calibration may be conducted between individual sheets of recording medium as well as when the movement of the recording medium has been temporarily curtailed. It is obvious, therefore, that a second gutter is necessary at each stitch point "P" (see FIG. 2) or that an elongated gutter across the entire width of the recording medium be used when no recording medium is present to receive the ink droplets.

Any well known recording medium transport mechanism 36 may transport the individual sheets of recording medium at a controlled rate of speed past the streams of ink droplets 24 emitted from the droplet generator 12. Since the printer 10 is a high speed device, a mechanism (not shown) must be included in the transport 36 for delivering unmarked sheets of recording medium, such as paper, to the transport and for stripping the ink printed recording medium away from the transport, once it has been encoded by the printer 10.

The continuous stream ink jet printing methodology begins with the receipt by a controller input 50 of a series of signals representative of digitized or video data information. The controller 38 converts these signals to a digitized voltage representation which is output to a digital to analog converter 42 which converts the digital signal representative of the desired voltage into an analog signal which is coupled to a power amplifier 52. In addition to generating a charging voltage for the plurality of charging electrodes 26, the controller 38 monitors and/or provides control signals for a variety of other components in the printer 10. Thus, as seen in FIG. 1, the controller 38 receives inputs from the sensor 32 via amplifier 39 and an analog to digital converter 43, controls the speed of movement of the recording medium 20 via another amplifier 47 and a second digital to analog converter 44 which drives a motor 45, controls perturbation in the droplet generator 12 by the source of excitation 22 through a third digital to analog converter 41 and amplifier 46 and controls the pressure maintained inside the generator manifold 13 by the pump 18 with a fourth digital to analog converter 40 and amplifier 37. Although critical to the operation of the ink jet printer 10, these functions do not relate directly to the inventive feature of correcting the droplet throw distance per nozzle or groups of nozzles, discussed later, and therefore, need no further description.

In FIG. 2, a partial plan view shows a few nozzles 15 with their continuous ink streams 14, charging electrodes 26, deflection electrodes 28, printing plane 19, and sequentially fanned or swept trajectories 29 which print on each of the nozzles' assigned segment "L" at the printing plane 19. The recording medium 20 is shown in dashed line and the normal stitch point "P" is shown at the printing plane for comparison with the stitch points "N" and "M" which are respectively closer (+Z) and farther away (−Z) from the nozzles than the normal stitch point. For convenient directional reference, an orthogonal coordinate system of coordinates X, Y, and Z are used as shown in FIG. 2, where the distance from the nozzle to the printing plane 19 is the Z direction and the X direction is the direction that the droplets to be printed are separated to print segments L. The direction +Y is the direction of recording medium movement, see arrow 17 in FIG. 1. As explained earlier, the stitch point is that location between adjacent segments "L" printed by adjacent nozzles. The stitch point is defined as the interface between two end pixels from separate, adjacent segments, the two end pixels contacting or confronting each other. These two pixels are always printed by droplets from separate but adjacent nozzles. The two end pixel centers are separated by the distance "d", which is about the distance across a pixel or the spot produced by a droplet after it impacts the recording medium, i.e. 75 microns ±12. By maintaining this relationship between droplets, especially at the stitch points, the droplets are not excessively overlapped or too far apart to produce high quality printing of information.

As used herein, the droplets 24 are in flight generally parallel to the X-Z plane, and are all directed to pixels in the X-Y printing plane 19.

Printing is done in a raster or sweeping pattern comprising multiple scan lines or print lines of pixels, where each nozzle is assigned a linear series of pixels which make a segment L. If all of the segments L across the recording medium 20 are printed, a solid line across the full width of the moving recording medium is produced. A single droplet is targeted for a single, specific pixel location in the assigned segment L. The role of the sensor 32 is to insure that the droplet placement relative to the pixels within printing plane 19 are accurate. That is, any errors in droplet placement detected by the sensor 32 are correctable.

The scan or print lines of ink droplets are deposited, as indicated above, onto target pixels along the X axis, while the recording medium moves along the Y axis. The relative movement gives rise to the two dimensional raster image composed of multiple, parallel printed lines of pixels, each line being made up of segments L having a predetermined number of pixels therein. The presence or absence of a liquid droplet printed at each pixel is the means by which an image of information is constructed.

In the printer 10, as depicted in FIGS. 1 and 2, a stitched array of continuous streams of droplets are fanned out in the X-Z plane to impact at the printing plane 19 to form the segments L, which segments abut each other in end-to-end fashion. The abutting ends are the stitch points P referred to above. The droplets from adjacent nozzles that print the abutting pixels of the two separate segments approach their respective target pixels at an angle $\alpha$ to the printing plane 19 that is typically six degrees. Thus, if portions of the surface of the recording medium is not co-extensive with the printing plane as shown at locations M and N, the stitching point will be in error by approximately one mil for each five mils of recording medium surface variation. At the recording medium surface location N, the droplets printing the stitch point are too far apart and form a gap while at location M, the droplets overlap. For high quality printing, the total allowed error in droplet placement is 0.3 mils. Generally, variations in paper thickness, roller concentricity and circumferential variations along the axes of the rollers of the transport mechanism 36, and other tolerance buildup and mechanical effects may cause variance in the surface of the recording medium to be as great as 20 mils. Such variations in the droplet throw distance, also referred to as the depth of focus for the printer, cannot be taken into account by the calibration sensor 32 because the calibration algorithm effects stitching from measurement taken at the sensor 32 and extrapolates to the assumed recording medium surface, which is, of course, the printing plane 19.

The distance sensing sensor 34 comprises an array of either optical devices 48 or pneumatic proximity sensing devices 49 which monitor the actual distance from the devices to selected regions of the recording medium and compare it to a reference dimension. Both optical and pneumatic devices or a combination of both are capable of sensing the actual recording medium surface portion to be printed and of correcting the droplet trajectories to maintain droplet placement and stitching within the 0.3 mil tolerances by the controller 38 via control circuit 27, amplifier 27 and analog to digital converter 35.

The control circuit 27 includes a light source for the optical device 48 and/or the pneumatic source for the pneumatic proximity device 49. In each device, a signal is generated which represents the actual distance from the sensor 34 to the surface of the recording medium. This signal is received by the control circuit 27 which compares it to the signal representative of the distance from the sensor 34 to the printing plane 19. The comparison is transmitted to the controller 38 for use in modifying the voltage to the charging electrode 26 or the deflection electrode 28 to modify a subsequently generated droplet trajectory in order to compensate and correct for the change in the droplet throw distance. The controller uses an extrapolating technique to adjust the trajectories of the droplets which are targeted for pixels on the recording medium 20 that lie between the actually sensed regions of the recording medium by any two or more optical or pneumatic devices of the distance sensing sensor 34. This is a feed forward or anticipatory control, since the actual imaging performance is not sensed. The accuracy of the correction depends of the open loop gain of the distance sensing sensor 34, the deflection control circuitry and the mechanical integrity of the droplet generator 12.

If an optical distance sensing sensor 48 is used, it generally has a light transmitter and light receiver for the reflected light received from the actual printing surface. The return signal is related to the distance of the light-scattering surface of the recording medium 20 from the optical device. An example of such an optical distance-sensing device is one marketed as HED 1000 by the Hewlett Packard. The HED 1000 has an integral light emitting diode (LED) and photodiode with focusing lenses. This device has a one mm field at four mm spacing from the recording medium. An array of these optical devices 48 are mounted in a supporting structure 51. In one embodiment, the supporting structure is fixed and in another embodiment, the supporting structure 51 is translatable from side-to-side for a predetermined distance in a direction parallel to the printing plane and perpendicular to the direction of movement of the recording medium as shown by arrow 53. By being movable, the optical devices may sense the throw distance from the nozzles to at least two separate locations on the recording medium surface. Each optical device may provide for a throw distance correction for one nozzle or a group of nozzles. When an array of optical sensors 48 (or an array of pneumatic proximity sensors 49) is used more than one wrinkle or curl in the recording medium surface may be sensed as well as the other factors affecting the throw distance that were mentioned above.

For general exemplary discussions of pneumatic proximity sensors 49, refer to U.S. Pat. No. 3,844,161 to F. X. Kay and to the article entitled "Classification of Pneumatic Proximity Position Sensors," Machine and Tooling, Vol. 48, No. 1, 1977, pages 36–38 by B. A. Sentyakov et al. Such pneumatic devices basically comprise a transmitter adapted to direct one or more jets of compressed air against the object to be sensed and a receiver adapted to respond to the change in air pressure produced by varying distances of the object to be sensed from the receiver. Usually, the pneumatic transmitter and receiver are formed as a single unit and are very accurate for distances between 0.5 to 2 mm from the object sensed with sensitivity tolerances down to about 10 microns.

As stated above, the droplet throw distance sensor 34 is mounted on a support member 51 which may be either fixed or translatable. Any well known means (not shown) may be used to translate the support member between at least two positions in the direction shown by arrow 53. For example, it may be spring biased in one translation direction and moved in the other by solenoid or cam acting on a follower integral with the support member.

In recapitulation, this invention relates to improving the droplet placement accuracy of a multiple nozzle, continuous stream type pagewidth ink jet printer by monitoring the variation in the distance from the nozzles to the surface of the recording medium referred to as the droplet throw distance or depth of focus, and adjusting the charging electrode voltage or deflection electrode voltage to compensate for the increase or decrease in the throw distance. The throw distance is monitored by either an array of electro-optical sensors, each having a light sender such as a LED and photodiode receiver for reflected light, or an array of pneumatic proximity sensors, each having a compressed gas source such as air, directed towards the recording medium from orifices and differential pressure monitoring means to sense changes in the ratio of pressure at the orifices and the pressure of the pneumatic source. The throw distance sensors may monitor selected regions of the recording medium from a fixed support member or a translatable support member. The support member and sensors are located below the ink droplet trajectories and spaced from the recording medium surface between 0.5 and 4 mils for optical sensors and between 0.5 and 2 mm for pneumatic proximity sensors. If the sensor support member is translated, it may sense the throw distance for at least double the number of regions of the recording medium sensed by a fixed sensor support member.

Other embodiments and variations of the invention will be apparent to those skilled in the art from a reading of the specification and from the drawings. It is the intention of this invention that all such other embodiments and variations be encompassed within the scope of the present invention.

I claim: .

1. An improved, continuous stream type ink jet printer of the type having a grounded, pressurized droplet generator with a plurality of nozzles in a linear array which emit streams of ink therefrom that are directed towards a moving recording medium, a charging electrode for each stream of ink located at the location where ink droplets are formed, whereat each droplet is encoded with a voltage representative of digitized information, a deflection electrode pair for each stream of droplets to direct the passing droplets to a specific location on the recording medium or to a gutter in accordance with the voltage the droplets received from the charging electrodes, a calibration sensor for calibrating the droplets so that they are properly stitched together at a predetermined printing plane, and a controller for operating the printer wherein the improvement comprises:

a linear array of distance sensing sensors mounted in a support member that is located below the droplet trajectories, the distance sensing sensors being parallel to the surface of the recording medium and perpendicular to direction of movement thereof, each distance sensor being adapted to produce a signal representative of the actual droplet throw distance from one or more nozzles to the surface of the recording medium at predetermined time periods;

means for comparing the signal representative of the actual droplet throw distance with a signal representative of a predetermined droplet throw distance;

means for generating a comparison signal in response to the comparison of the actual and predetermined throw distance signals, said comparison signal indicating any increase or decrease in the actual throw distance relative to the predetermined throw distance; and means for adjusting the droplet trajectories in response to said comparison signals to correct the droplet trajectories for variations in the droplet throw distance relative to the predetermined printing plane and maintain the droplet placement accuracies in spite of said throw distance variations.

2. The improved ink jet printer of claim 1, wherein the distance sensing sensors are electro-optical devices having a light transmitter for directing a light on the recording medium surface and a light receiver for receiving the light reflected from the recording medium surface, the electro-optical devices being adapted to generate signals indicative of the actual droplet throw distance based upon the reflected light received.

3. The improved ink jet printer of claim 1, wherein the distance sensing sensors are pneumatic proximity sensors having orifices for directing a source of compressed gas against the recording medium surface and pressure monitoring for sensing the difference in the pressure at the orifices and the pressure of the source, the pneumatic sensors being adpated to generate the signal indicative of the actual droplet throw distance based upon the changing pressure difference sensed by said pressure monitoring means.

4. The improved ink jet printer of claim 1, wherein the distance sensing sensors are a combination of electro-optical devices and pneumatic proximity sensors.

5. The improved ink jet printer of claim 1, wherein the printer controller, upon receipt of the comparison signals, adjusts the trajectories of droplets targeted for pixels on the recording medium that lie between the actually sensed regions of the recording medium by the distance sensing sensors by extrapolation between two or more comparison signals.

6. The improved ink jet printer of claim 1, wherein the improvement further comprises:

means for translating the support member having the array of distance sensing sensors back and forth a predetermined distance in direction parallel to the predetermined printing plane and perpendicular to the direction of movement of the recording medium, so that each of the distance sensing sensors may sense more than one surface area location along a linear width of the moving recording medium.

* * * * *